US008352445B2

(12) United States Patent
Begel et al.

(10) Patent No.: US 8,352,445 B2
(45) Date of Patent: Jan. 8, 2013

(54) DEVELOPMENT ENVIRONMENT INTEGRATION WITH VERSION HISTORY TOOLS

(75) Inventors: Andrew B. Begel, Seattle, WA (US); Gina D. Venolia, Bellevue, WA (US); Reid T. Holmes, Calgary (CA)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 12/126,251

(22) Filed: May 23, 2008

(65) Prior Publication Data

US 2009/0293043 A1   Nov. 26, 2009

(51) Int. Cl.
G06F 17/30 (2006.01)
(52) U.S. Cl. ...................................... 707/695
(58) Field of Classification Search ........................ None
See application file for complete search history.

(56) References Cited

U.S. PATENT DOCUMENTS

| | | | |
|---|---|---|---|
| 6,523,027 B1 * | 2/2003 | Underwood ........................... | 1/1 |
| 6,993,710 B1 * | 1/2006 | Coad et al. ..................... | 715/202 |
| 7,657,582 B1 * | 2/2010 | Cram et al. .................... | 707/640 |
| 2003/0131342 A1 | 7/2003 | Bates et al. | |
| 2003/0182652 A1 | 9/2003 | Custodio | |
| 2005/0010880 A1 * | 1/2005 | Schubert et al. ................... | 716/4 |
| 2006/0041864 A1 | 2/2006 | Holloway et al. | |
| 2006/0101443 A1 * | 5/2006 | Nasr ............................. | 717/163 |
| 2006/0236301 A1 | 10/2006 | Minium et al. | |
| 2007/0011659 A1 | 1/2007 | Venolia et al. | |
| 2007/0143747 A1 | 6/2007 | Taylor et al. | |
| 2007/0204169 A1 | 8/2007 | Bahl et al. | |
| 2007/0250549 A1 * | 10/2007 | Meyer et al. ................... | 707/203 |
| 2007/0261036 A1 | 11/2007 | Drake et al. | |
| 2007/0299825 A1 | 12/2007 | Rush et al. | |
| 2008/0148225 A1 * | 6/2008 | Sarkar et al. ................... | 717/107 |
| 2009/0070734 A1 * | 3/2009 | Dixon et al. ................... | 717/102 |

OTHER PUBLICATIONS

McCarey, et al., "A Case Study on Recommending Reusable Software Components using Collaborative Filtering", Proceedings of Mining Software Repositories (MSR) Workshop, Edinburgh, Scotland, UK. May 2004. 5 Pages.
Sugumaran, et al., "A Semantic-Based Approach to Component Retrieval" The Data Base for Advances in Information Systems—Summer 2003 (vol. 34, No. 3). pp. 8-24.
Hipikat, "Recommending Useful Software Artifacts", http://www.cs.ubc.ca/tabs/spi/projects/hipikat/, Reprinted from the Internet on May 22, 2008, 1 pg.
"Visual Basic IntelliSense Code Snippets", http://msdn.microsoft.com/en-us/library/18yz4be4(VS.80).aspx, Reprinted from the Internet on Feb. 28, 2008, 1 pg.
"Intellisense for Vim", Sourceforge, http://sourceforge.net/docman/display_doc.pp? docid=19936&group id=94700, Reprinted from the Internet on Feb. 28, 2008, 11 pgs.

* cited by examiner

*Primary Examiner* — Bai D. Vu
(74) *Attorney, Agent, or Firm* — Microsoft Corporation

(57) ABSTRACT

Instructions within an instruction set (such as source code for a software application) may be documented within many separate tools, such as a development environment, a version control system, and a bug report database. However, it may be inefficient to search for such information in many locations and through many interfaces while investigating the version history of an instruction. Instead, the development environment may be configured to retrieve relevant information (such as bug reports, versioning, and version release notes) and to display the version history information for a selected instruction together within the development environment.

20 Claims, 8 Drawing Sheets

90 ⟶

```
DEVELOPMENT ENVIRONMENT – ContainerClasses.cs     △▽⊗    — 12
```
32 ⟶
public class BubbleSortList<T> : List<T> where T : IComparable<T> {  — 14 public void Sort() {
        for (bool bContinue = true; bContinue == true;) {
        bContinue = false;
            for (int i = 1; i < this.Length; i++) {

| 34 INSTRUCTION VERSIONS | 36 INSTRUCTION VERSION MOTIVATIONS | |
|---|---|---|
| Version 0.9.14.2  John Smith | Bug: BubbleSortList crashes with invalid index exception | Joe Baker |

| 92 REFERENCING COMPONENTS | 94 REFERENCED COMPONENTS |
|---|---|
| BubbleSortStringList Class<br>BubbleSortIntList Class<br>PhotoDatabaseProject.MainForm Class | List Class<br>IComparable Interface<br>IEnumerable Interface |

```
DEVELOPMENT ENVIRONMENT – ContainerClasses.cs     △▽⊗    — 12
```
public class BubbleSortList<T> : List<T> where T : IComparable<T> {  — 14 public void Sort() {
        for (bool bContinue = true; bContinue == true;) {
        bContinue = false;  — 32
            for (int i = 1; i < this.Length; i++) {

| 34 INSTRUCTION VERSIONS | 36 INSTRUCTION VERSION MOTIVATIONS | |
|---|---|---|
| Version 0.9.14.2  John Smith | Bug: BubbleSortList crashes with invalid index exception | Joe Baker |

102 ⟶

| ANNOTATIONS | |
|---|---|
| This instruction references the Length property repeatedly. We tried storing the value and referencing it, but this raised exceptions with multithreaded use, and this class is too lightweight for using a concurrency control mechanism for the Length property. | Maria Brown |

| DEVELOPMENT ENVIRONMENT – ContainerClasses.cs | △▽⊠ |

― 12
― 14

```
public class BubbleSortList<T> : List<T> where T : IComparable<T> { public void Sort() {
        for (bool bContinue = true; bContinue == true;) {
            bContinue = false;                    ― 32
            for (int i = 1; i < this.Length; i++) { ⊘⊗   ― 112
```

| 34 | 36 | | |
|---|---|---|---|
| INSTRUCTION VERSIONS | INSTRUCTION VERSION MOTIVATIONS | | |
| Version 0.9.14.2 | John Smith | Bug: BubbleSortList crashes with invalid index exception | Joe Baker |

| 114 | 116 |
|---|---|
| BOOKMARKED INSTRUCTION | LATEST INSTRUCTION VERSION HISTORY |
| HeapSortTree Class | New Version: 0.9.15.1 |
| RadixExchangeList.Add Method | Bug Report: RadixExchangeList access parameters are incorrect |
| BubbleSort.Sort: "for (int I = 1;" Instruction | New Version: 0.9.12.1 |

| DEVELOPMENT ENVIRONMENT – ContainerClasses.cs | △▽⊠ |

― 14

```
public class BubbleSortList<T> : List<T> where T : IComparable<T> { public void Sort() {
        for (bool bContinue = true; bContinue == true;) {
            bContinue = false;                    ― 32
            for (int i = 1; i < this.Length; i++) {
```

| 34 | | 36 | |
|---|---|---|---|
| INSTRUCTION VERSIONS | ― 122 | INSTRUCTION VERSION MOTIVATIONS 122 ― | |
| Version 0.9.14.2 | John Smith ⊘⊗ | Bug: BubbleSortList crashes with invalid index exception | Joe Baker ⊘⊗ |

| 124 | 126 |
|---|---|
| PARTICIPANT | OTHER ACTIVITY |
| Joe Baker | Bug: BubbleSortList crashes with invalid index exception |
| | Bug: BubbleSortList only sorts first 65,536 entries |
| John Smith | Version 0.9.14.2 |
| David Hsu | Version 0.8.3.4 |

FIG. 10

DEVELOPMENT ENVIRONMENT INTEGRATION WITH VERSION HISTORY TOOLS

BACKGROUND

Development of instruction sets (such as software) often occurs within a development environment that facilitates the organization of instructions and assembly into working products (such as compiled programs.) For example, the development environment may provide an integrated help tool for providing information on available instructions, an integrated compiler for building assemblies, and an integrated debugger to trace programming flow.

Such instruction sets may be developed through many versions, where groups of instructions may be changed to achieve improvements in prior versions of the instruction sets (e.g., to correct errors, to add features, or to improve compatibility with other components.) These new versions may be tracked, e.g., in a versioning tool that may record changes among versions of an instruction and may display a version of the instruction set at a particular stage of development.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

New versions of instruction sets are often developed in view of particular motivations, e.g., addressing a bug or implementing an idea. These motivations may be documented in various tools, such as a bug database used to track observations of and information about incorrect or inconsistent program behavior. However, these tools are often external to the development environment, and a developer who wishes to investigate the circumstances of a particular instruction may have to conduct searches and reading outside of the development environment, such as in a web browser. Moreover, the separation of the historic information from the development environment may be inefficient; e.g., a bug tracking database may not be tied to the particular instructions and versions of such instructions that were found to cause the undesirable behavior and/or motivate the updating of the instruction to a new version.

An alternative design of a development environment may be devised that integrates the documentation tools, such that the various documentation and testing tools that together illustrate the motivation of a developer in creating a particular version of an instruction in an instruction set. For example, the development environment may store and utilize associations of a version of an instruction with observations recorded in a bug database that indicate an undesirable behavior caused by the instruction, and with notes by the developer of the version concerning the improvements to be achieved by the version as compared with other versions of the instruction. Accordingly, when a developer wishes to explore the history of an instruction (comprising one or more versions of the instruction, including the current version), the development environment may query the various sources of information about the instruction and aggregate the results into a summary of the version history of the instruction. This information may then be presented to the developer within the development environment, thereby facilitating an understanding of the particular configuration without interrupting the focus of the developer within the development environment. Additional features may be included in the development environment to enhance further the researching of version histories of an instruction (e.g., by identifying participants in the development of a version of the instruction, who may have additional and/or specialized knowledge of the circumstances of the development, and by facilitating contact with such participants by retrieving and displaying contact information.)

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 7 is an illustration of yet another development environment configured to retrieve and display information about a selected instruction within the development environment.

FIG. 8 is an illustration of yet another development environment configured to retrieve and display information about a selected instruction within the development environment.

FIG. 9 is an illustration of yet another development environment configured to retrieve and display information about a selected instruction within the development environment.

FIG. 10 is an illustration of yet another development environment configured to retrieve and display information about a selected instruction within the development environment.

DETAILED DESCRIPTION

Figure 1:
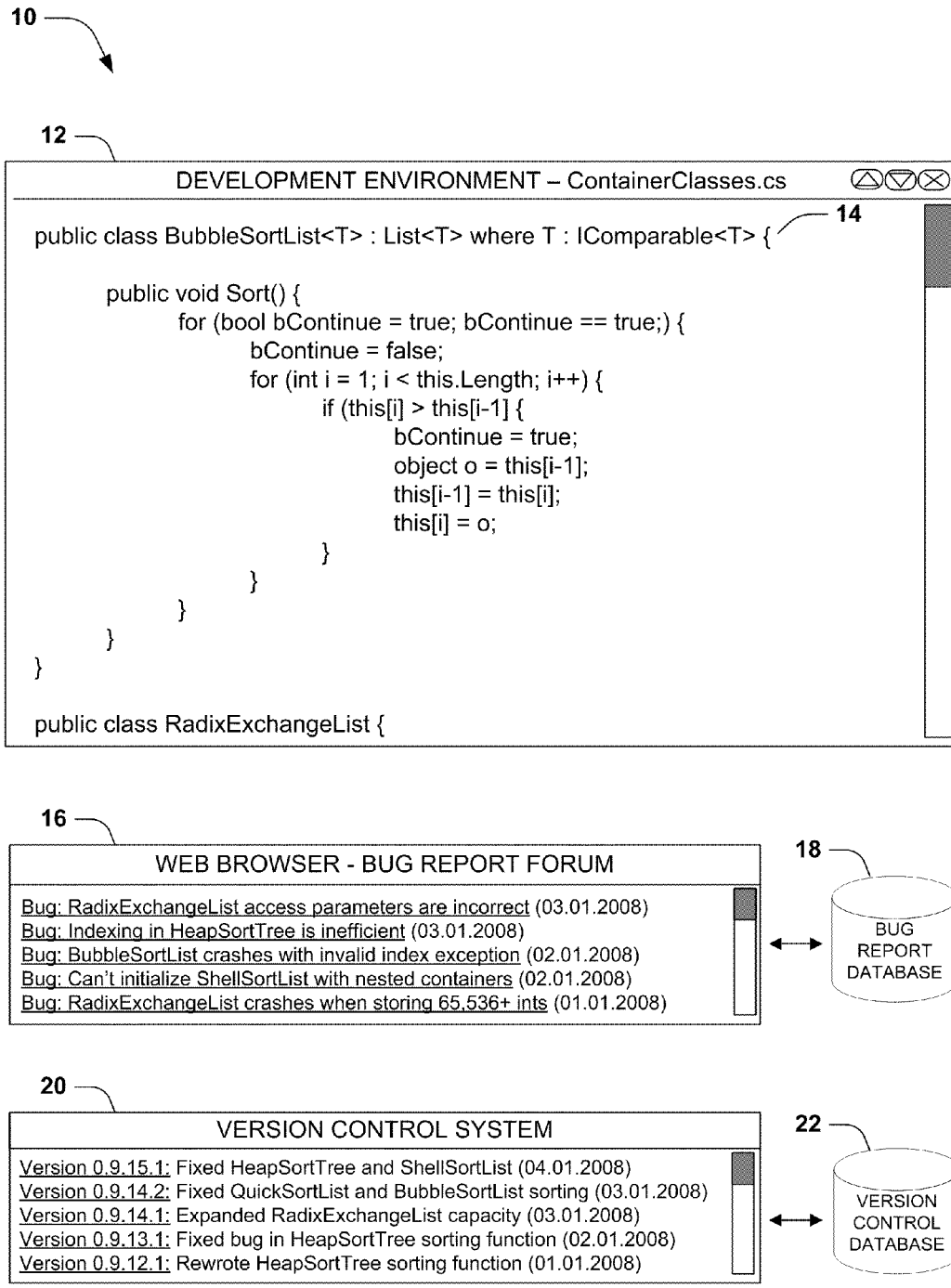
FIG. 1 is an illustration of a development environment and external tools comprising information regarding instructions of an instruction set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many scenarios involve the development of an instruction set, comprising one or more instructions selected by one or more developers in a particular configuration that together achieve a desired mechanism. One such scenario is software development, wherein an application is designed as a set of instructions for manipulating devices and data in a particular manner; however, other endeavors may also satisfy this description, such as the development of mathematical formulae in an engineering endeavor or a manufacturing schematic for fabricating a workpiece in a particular fashion.

In such scenarios, one or more developers may seek an advantageous configuration of instructions in an instruction set to achieve a desired result. The designing of such instruction sets may be facilitated by a development environment, which may assist developers by providing information with the selection of instructions, the testing of the instruction set in various conditions (e.g., by application of exemplary testing data sets), and the debugging of the operation in furtherance of an improved instruction set. The development environment may assist users in creating, adjusting, reviewing, and utilizing instruction sets, and may be provided (e.g.) as a windowed application, a console application, a web interface, etc. The development environment may therefore incorporate various components, such as a documentation component that describes available instructions, a compiler component that generates a result of the instruction set (e.g., a partially or wholly compiled software application, or a predicted result of a fabrication run), and/or a debugging component that facilitates testing and exploration of the instruction set in action (e.g., a code profiling tool that measures performance, or a trace tool that records the flow of instructions during use of the instruction set.)

A developer may seek to develop a new version of an instruction set, and the changes implemented to formulate the new version may be driven by a specific motivation (e.g., addressing a particular undesirable behavior or implementing a particular improvement in features or compatibility.) Often, these motivations are documented in other tools, e.g., in a bug-tracking database or a web forum, where testers and users may describe suggestions for updating the instruction set to reduce bugs. As new versions are developed, the developer may author documentation describing the motivations for creating new versions, such as observations of deficiencies or ideas for improvements.

In pursuing these motivations while updating an instruction in an instruction set, a developer may not fully understand why an instruction in a current version is configured in a particular manner, or why a particular behavior is occurring. The developer may therefore endeavor to research the documentation relating to an instruction in the instruction set, such as the recorded thoughts of another developer who participated in the creation of the current version of the instruction. However, such documentation may exist in tools that are not easily accessible within the development environment; e.g., the research may involve reading about bugs on a web forum or in a bug-tracking database tool, reading version notes in a document reader tool, and reading developer motivations in a developer weblog or ad hoc documentation. If the developer is motivated to contact a developer of a previous version, a developer contact database may be utilized to identify contact information (such as an email address and office number), and a separate communication program (such as an email client or an instant messaging client) may be utilized to establish contact with the latter developer.

The disjointed aspect of these discrete tools may result in inefficiency in the research of the developer into the status, history, and conceptual mechanics of an instruction. FIG. 1 illustrates an exemplary scenario 10 in which a developer utilizes a development environment 12 in the development of an instruction set 14, illustrated herein as a programming library for a set of container classes to be used in other applications. In this exemplary scenario 10, the instruction set 14 features container classes such including a BubbleSortList class for sorting comparable objects according to a simple bubble-sort algorithm, a QuickSortList class for sorting comparable objects according to a quick-sort algorithm, a RadixExchangeList class for sorting a list of integers according to a radix exchange sorting algorithm, and a HeapSortTree class for organizing a set of prioritized objects according to a heap-sort (also known as a priority queue) algorithm. The instruction set 14 is edited in the development environment 12, which may provide support services to the developer(s), such as context-sensitive help, compiling and linking tools, and support for debugging and tracing an executing version of the instruction set 14.

The instruction set 14 may be developed through multiple versions, each prepared by a developer in view of some motivations, such as addressing particular bugs or implementing new features. In this exemplary scenario 10, as in many contemporary development scenarios, the versions of the instruction set 14 are stored in a version control system 20, which may (e.g.) capture a snapshot of the instruction set 14, assign it a version number based on a version numbering scheme, and store it in a version control database 22. Developers may also include some comments regarding the changes made to respective versions of the instruction set 14 stored in the version control system 20, such as notes about particular classes or methods that are newly introduced or newly altered with respect to prior versions.

The different versions of the instruction set 14 may also be directed toward particular motivations. For example, a first version of the instruction set 14 may be intended to fix a particular bug observed in a prior version of the instruction set 14, while a second version may be intended to include a new class or an improvement to an existing class as compared with a prior version of the instruction set 14. Some such motivations might be documented (e.g.) in a bug report forum 16, which may include reports of potential bugs observed by users (such as alpha and beta testers of pre-release software, customers of a released software product, etc.) that may be addressed by the developers of the instruction set 14. These bugs may be accepted by the software providing the bug report forum 16, and may be stored in a bug report database 18.

Within the exemplary scenario 10 of FIG. 1, a developer working with an application may wish to understand its history according to the succession of versions of the instruction set 14. However, the development environment 12 may not be configured to present such information to complement the contents of the source code comprising the instruction set 14. As a first example, the version control system 20 may be integrated to various degrees with the development environment 12; e.g., a tightly integrated version control system 20 may allow developers to invoke version capturing within the development environment 12, while a loosely integrated version control system 20 may comprise a standalone tool that allows a user to select a particular snapshot of the instruction set 14 to be loaded into a new instance of the development environment 12. In particular, the version control system 20 may not be capable of presenting developer documentation of a version within the development environment, and the developer may have to review different versions of the instruction set 14 and related developer documentation in an external version control system 20 before loading a desired version into the development environment 20. Moreover, the version control system 20 might not include information about the versioning of particular instructions of the instruction set 14, and it may be difficult to tell which versions pertain to a particular instruction or group of instructions in the instruction set 14, such as the Sort method of the BubbleSortList class. As a second example, the bug report forum 16 is not coupled with the development environment 12, and is accessed through a standalone browser, such as a web browser, and it may be difficult to track which bug reports in the bug report database 18 pertain to a particular instruction in the instruction set 14.

This incomplete coupling of design tools results in inefficiencies, such as those illustrated in the exemplary scenario 10 of FIG. 1. For example, a developer may not understand why an instruction was written in a particular manner; e.g., with regard to the illustrated portion of the instruction set 14, a new developer may wish to understand why the sorting loop begins sorting at index 1 instead of index 0 of the zero-indexed array forming the base class for the BubbleSortList class.) An explanation of this behavior may be indicated in the versioning information, which may be not accessible to the developer within the development environment 12. The developer may have to exit the development environment 12 to examine the contents of the version control database 22 through the version control system 20, which may not be capable of indicating which versions of the instruction set 14 relate to instructions in the Sort method of the BubbleSortList class. The developer may instead have to read through the version notes of each version to find relevant versions (e.g., it is not readily apparent at first glance that version 0.9.14.2 pertains to the method of interest), which may be inaccurate and time-consuming. Similarly, this discovery may evidence a change in the instruction set 14 (e.g., from "for (int i=0 . . . " to "for (int i=1 . . . "), but may not indicate a motivation or explanation for this change. The developer may then have to search the bug report database 18 through yet another tool, such as a bug report forum 16 viewed in a web browser; again, such information might not easily be correlated with particular portions of the instruction set 14, and it may be difficult to locate relevant bug reports (e.g., the "BubbleSortList crashes with invalid index exception" entry.) As a result, the developer separately interacts with several design tools in order to extract information contained among such sources that relates to a particular portion of the instruction set 14. In large projects with many developers, bug reports, and versions, this research may be particularly onerous, and may diminish productivity and coordination among team members.

Figure 2:
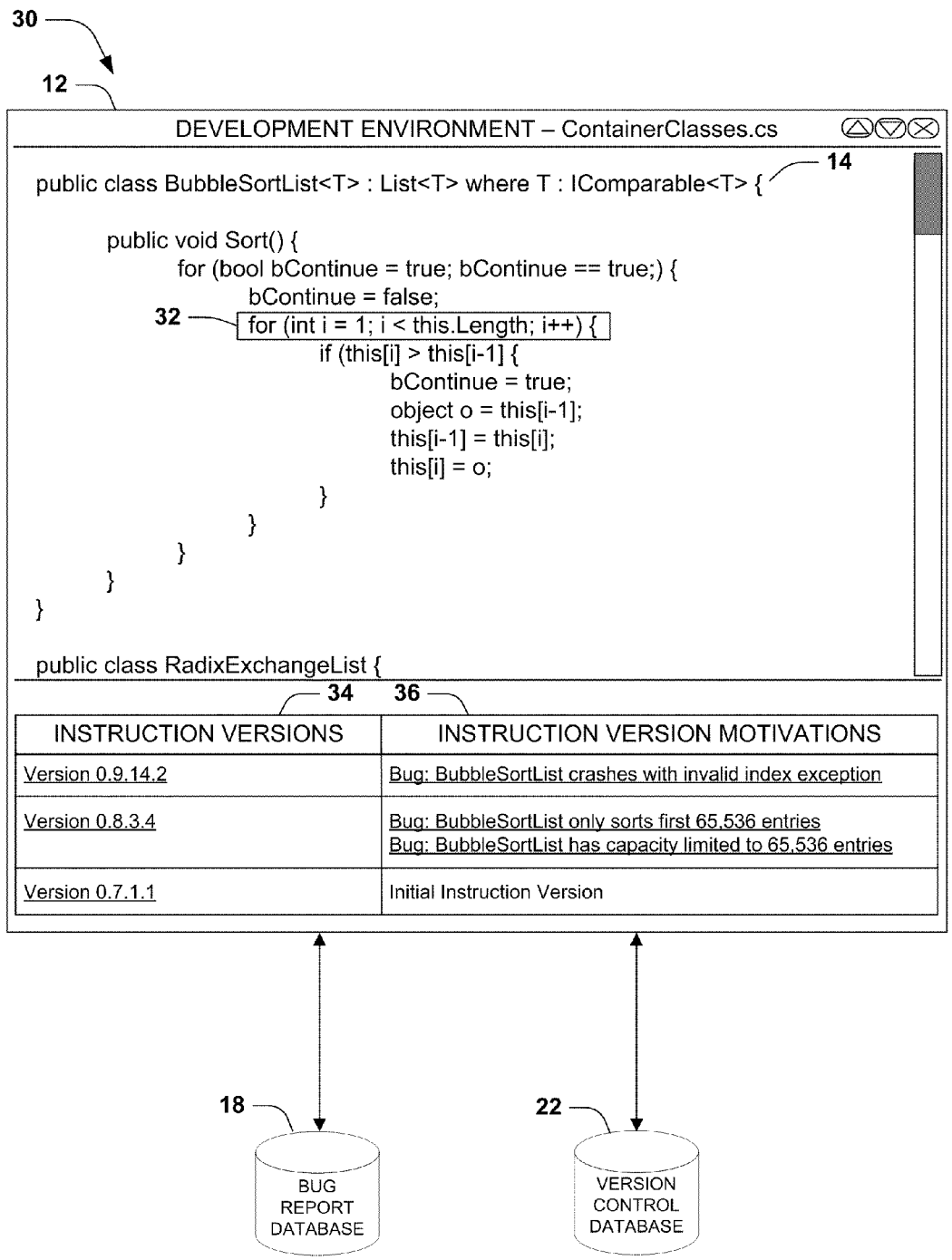
FIG. 2 is an illustration of a development environment configured to retrieve and display information about a selected instruction within the development environment.

FIG. 2 illustrates an alternative exemplary scenario 30 of a design environment 12 featuring a tighter integration of the version control database 22 and the bug report database 18, such that information relating to a particular portion of an instruction set 14 may be presented within the development environment 12. The bug report database 18 may be configured to associate bug reports with particular portions of the instruction set 14 (e.g., particular instructions or groups of instructions.) The version control database 22 may also be configured to store information indicating which versions of the instruction set 14 relate to particular portions of the instruction set 14, and may permit queries for such versions (e.g., the versions of the instruction set 14 that pertain to the "for (int i=1 . . . " instruction of the Sort method of the BubbleSortList class.) If so configured, the development environment 12 may be capable of identifying a selected instruction in the instruction set 14, retrieving relevant information from the bug report database 18 and the version control database 22, and presenting such information within the development environment 12. For example, if a developer selects the "for (int i=1 . . . " instruction, the development environment 12 may search these databases and indicate (e.g., within separate panes of the development environment 12) both a set of instruction versions 34 indicating the versions of the instruction set 14 in which the selected instruction 32 was created or changed, and a set of instruction version motivations 36 indicating the motivation of the developers in altering the selected instruction 32 in respective versions of the instruction set 14. Moreover, the development environment 12 may allow the developer to click on the instruction versions 34 to see the changes to the selected instruction 32 and/or the development notes for respective instruction versions, and to click on the instruction version motivations 36 to see the information contained therein (e.g., a fuller description of the bug arising within versions of the BubbleSortList class prior to version 0.9.14.2.) By accessing such information within the development environment 12, the developer may be able to explore the history and versioning motivations of the instruction set 14 in a quicker manner and without leaving the development environment 12 to access the data sources through isolated tools, such as the version control system 20 and the bug report forum 16.

Figure 3:
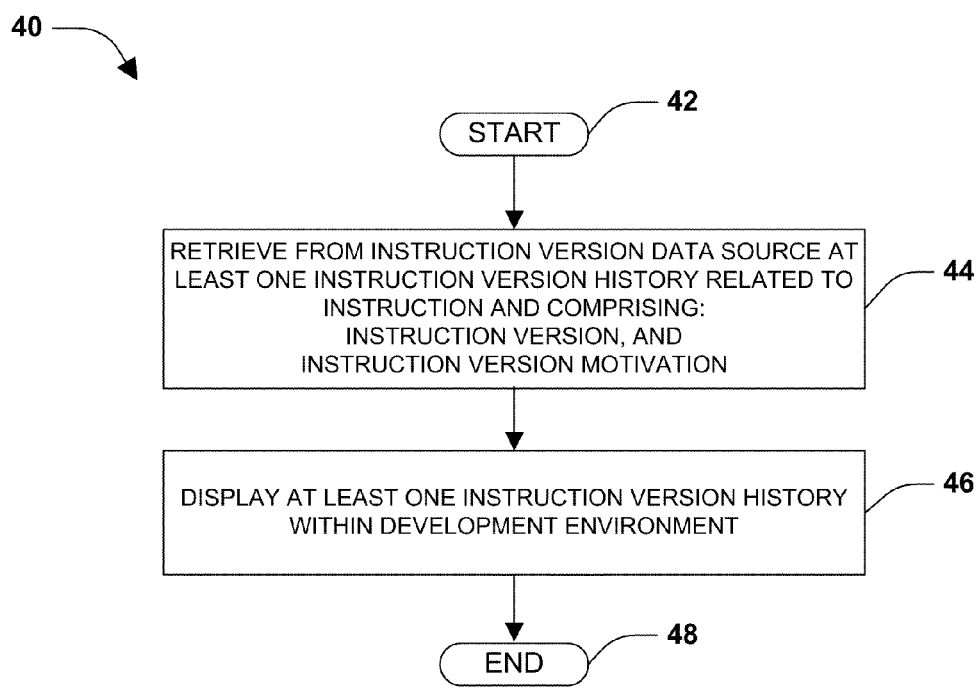
FIG. 3 is a flow chart illustrating an exemplary method of documenting a selected instruction of an instruction set within a development environment.

FIG. 3 illustrates a first embodiment of the techniques discussed herein, comprising an exemplary method 40 of documenting a selected instruction of an instruction set within a development environment. The exemplary method 40 begins at 42 and involves retrieving 44 from an instruction version data source at least one instruction version history related to the selected instruction, wherein the instruction version history comprises an instruction version and an instruction version motivation. The exemplary method 40 also involves displaying 46 the at least one instruction version history within the development environment. Having generated a set of descriptors of the history of the selected instruction within the instruction set and displayed it within the development environment, the exemplary method 40 thereby achieves the documenting of the selected instruction within the development, and so ends at 48.

Figure 4:
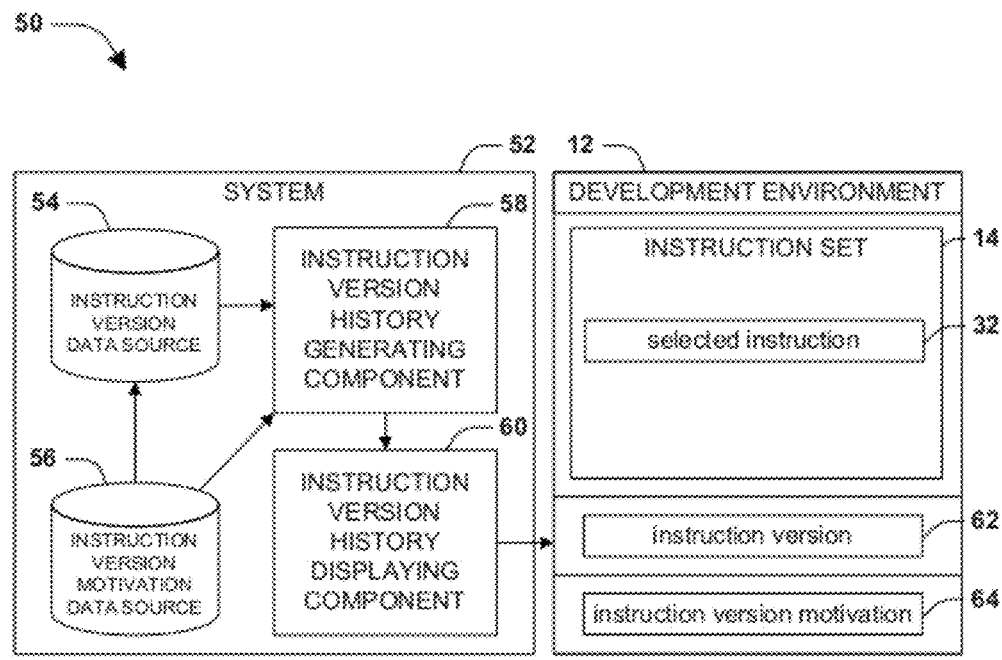
FIG. 4 is a component block diagram illustrating an exemplary system for documenting a selected instruction of an instruction set within a development environment.

FIG. 4 illustrates a second embodiment of the techniques discussed herein, illustrated within an exemplary scenario 50 involving a development environment 12 having an instruction set 14 with a selected instruction 32. Within this exemplary scenario 50 may be devised an exemplary system 52 for documenting the selected instruction 32 of the instruction set 14 within the development environment 12. The exemplary system 52 includes an instruction version data source 54 that comprises at least one instruction version of the selected instruction 32, and an instruction version motivation data source 56 comprising at least one instruction version motivation relating to the instruction version. The exemplary system 52 interfaces with the instruction version data source 54 and the instruction version motivation data source 56 through an instruction version history generating component 58, which is configured to retrieve at least one instruction version from the instruction version data source 54 relating to the selected instruction 32, and to retrieve at least one instruction version motivation from the instruction version motivation data source 56 relating to respective instruction versions of the selected instruction 32. The exemplary system 52 also includes an instruction version history displaying component 60, which is configured to display within the development environment 12 at least one instruction version history, comprising the at least one instruction version and the at least one instruction version motivation. Having generated an instruction version history for the selected instruction 32 and having displayed the instruction version history within the development environment 12, the exemplary system 52 thereby achieves the documenting of the selected instruction 32 within the development environment 12.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 52 of FIG. 4) to confer individual and/or synergistic advantages upon such embodiments.

A first aspect that may vary among embodiments of these techniques relates to the scenario to which such techniques may be applied. FIG. 2 illustrates an application of such techniques to computer code written in an object-oriented programming language to be compiled into a class library, and where the instruction version motivations comprise observed bugs. However, it may be appreciated that many other scenarios might advantageously utilize such techniques. As a first example, the development environment may comprise many types of tools for facilitating the selection and organization of instructions in the instruction set, including (e.g.) a simple text editor, a visual development environment, an object-oriented development environment such as an avatar- or component-based environment. As a second example, these techniques may be utilized with many types of instruction sets specified according to many types of operational languages, including (e.g.) other object-oriented programming languages such as Java and C++, non-object-oriented programming languages such as Lisp and Perl, declarative languages such as XML, query languages such as SQL and LINQ, machine-level languages such as assembly, and mathematical expressions. Those of ordinary skill in the art may be able to devise many scenarios to which the techniques discussed herein may be applied.

A second aspect that may vary among implementations relates to the architecture of systems designed to implement the techniques discussed herein. While the exemplary system 52 of FIG. 4 presents one architecture that embodies these techniques, it may be appreciated that those of ordinary skill in the art may develop many equivalent architectures, and some architectures may present additional advantages and/or reduce disadvantages in certain circumstances. As a first example, the instruction version data source 54 and the instruction version motivation data source 56 may comprise many types of data sources, e.g., a relational database, one or more files in a file system, an email repository, etc. These data sources may also expose the stored information through many types of interfaces; e.g., a relational data source may provide data through a query engine, a structured report or data set, a web service, a web interface (such as a web forum), etc. As a second example, the exemplary system 54 of FIG. 4 illustrates the instruction version data source 54 and the instruction version motivation data source 56 as separate data stores, but these data stores may be combined into a single data source that stores both instruction versions and instruction version motivations. As a third example, these data sources may be combined with other components of the exemplary system 52 (e.g., by integrating the instruction version history generating component 58 with one or both data sources, such as by designing it as a stored procedure that fetches data for an instruction and provides instruction version histories formatted in a particular manner.) As a fourth example, these data sources may also be combined with components of the development environment 12 (e.g., the development environment 12 may include one or both data sources, and/or may also serve as an instruction version history generating component 58 by retrieving information from one or both data sources and formatting it for use by the instruction version history displaying component 60.) As a fifth example, the development environment 12 may natively incorporate the instruction version history displaying component 60 as part of the user interface of the development environment 12, or may receive the output of an externally operated instruction version history displaying component 60 and may simply render the received output as part of the user interface of the development environment 12. Those of ordinary skill in the art may be able to devise many architectures that implement the techniques discussed herein.

A third aspect that may vary among implementations of these techniques relates to the nature of the motivation for creating a new version. The various types of documented motivations wherein the history of the instruction is described might affect design choices in the implementation of these techniques. As a first example, the motivations may be based on an instruction version behavior observation and an instruction version alteration description in response to the instruction version behavior observation. For example, and as illustrated in illustrated in the exemplary scenario 30 of FIG. 2, the motivation may comprise error observations (e.g., a bug report) submitted by a user of a version of the instruction set, and new versions devised to address the documented error observations (e.g., "this version addresses the bug described in this bug report.") However, other motivations may be documented according to the techniques discussed herein, such as an inefficiency observation (e.g., "this instruction works, but could be more efficient"), an inconsistency observation (e.g., "this instruction yields different results in equivalent circumstances"), an incompatibility observation (e.g., "this instruction does not work as expected if utilized in conjunction with this type of hardware or software"), an unexpected behavior observation (e.g., "this instruction resulted in a surprising side effect"), an improvement opportunity observation (e.g., "this instruction may be improved in some aspect by implementing the following tweaks/alternatives"), and a deprecated technique observation (e.g., "this instruction invokes a programming interface or code library that is obsolete, and using an alternative technique may improve the lifespan of the application.")

As a second example of this third aspect, the motivation and/or instruction version alteration description forming the basis of an instruction version history may include evidence supporting such documentation, e.g., a narrative of an observed behavior of the instruction version, a data capture relating to an observed behavior of the instruction version, or a screenshot illustrating an observed behavior of the instruction version. Such supporting evidence may be incorporated in the documentation (e.g., the development environment may include the screenshot or data capture), or may include references to such evidence (e.g., hyperlinks or thumbnails displayed within the development environment that, when clicked, display a screenshot or data capture illustrating the observation or the documented alteration.)

As a third example, the motivation may be documented by the instruction set development team members, managers or analysts who discover such motivations while reviewing the instruction set during development, an internal or external pre-release testing users, customers of a released application or developers utilizing a released code library based on the instruction set, members of the public participating in an open-source project involving the instruction set, etc. Those of ordinary skill in the art may apply these techniques to support the documentation of many types of motivations, and by many types of individuals, within the development environment in relation to instructions of the instruction set.

A fourth aspect that may vary among implementations of these techniques relates to the manner of selecting the instruction in the development environment. As a first example, the development environment may interpret user actions as focusing on certain elements of the instruction set (e.g., clicking on a component in a visual designer, such as a button in a window, or moving a caret within a text document in a text-based development environment.) The development environment may monitor the user focus, select one or more instructions that are a current focus of the user, and displaying the instruction version history for the selected instruction. For example, the text entry user interface may include a caret that may be positioned within the text, and based on the position of the caret, the development environment may infer which instructions the user wishes to select and to investigate the documented instruction version history. However, in some instances, the text selection may be ambiguous, and the development environment may have to choose one of many combinations of selected instructions for which the user wishes to view instruction version histories.

One technique for identifying a selected instruction may be applied when the development environment detects at least two instructions within an instruction set selection in the development environment (i.e., when the selection is ambiguous.) In this scenario, the development environment may select a first instruction in the instruction set selection, and may display the instruction version history within the virtual development environment for the first instruction. Moreover, upon detecting a user action indicating interest in a second instruction, the development environment may select the second instruction in the instruction set selection and display the instruction version history within the virtual development environment for the second instruction. However, those of ordinary skill in the art may devise many ways of inferring a selected instruction based on user input while implementing the techniques discussed herein.

Figures 5, 6:
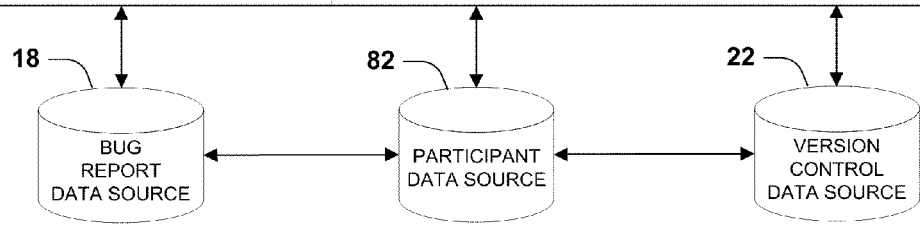
FIG. 5 is an illustration of another development environment configured to retrieve and display information about a selected instruction within the development environment.
FIG. 6 is an illustration of yet another development environment configured to retrieve and display information about a selected instruction within the development environment.

FIG. 5 illustrates an exemplary scenario 70 involving an ambiguous selection of instructions within an exemplary text-editor development environment 12, wherein the instruction set 14 comprises a set of text instructions entered by a text entry device (e.g., a keyboard.) A text-entry caret 72 is positioned within the text of the instruction set 14 in a position associated with an instruction. However, the caret 72 is also contained within the text comprising the Sort method, and the user may wish to view instruction version histories pertaining to the method as a whole; and the caret 72 is also contained within the text comprising the BubbleSortList class, and the user may wish to view instruction version histories pertaining to any part of the class. In such circumstances, the development environment 12 may choose any of the possible instructions as a selected instruction (e.g., perhaps the most specific instruction, such as the "for (int i=1; i<this.Length, i++)" instruction) and display the instruction version history for that instruction. However, the development environment 12 may also indicate the different sets of instructions to which the user selection might refer, and may also permit the user to choose among the sets of instructions for displaying an instruction version history. In the exemplary scenario 70 of FIG. 5, the development environment 12 includes a drop-down textbox 74 indicating possible selections of instructions indicated by the position of the caret 72. The most specific instruction of the options listed is selected, and the development environment 12 may therefore display the instruction version history of the selected instruction 32. However, the user may choose any of the other options (e.g., a selection of the whole BubbleSortList class), and the development environment 12 may respond by displaying the instruction version history for the newly selected instruction (e.g., any instruction version and instruction version motivation pertaining to any portion of the BubbleSortList class.)

A fifth aspect that may vary among implementations of these techniques relates to the displaying of additional information with relation to a selected instruction, such as the supplementing of an instruction version history with additional information describing the history of the instruction. As a first example, the instruction version history may include references to participants who have been involved in creating an instruction version history. Such participants might include individuals such as developers, testers, users, etc., and even groups of individuals or automated tools involved in the development (e.g., "this class was auto-generated by the development environment.") FIG. 6 illustrates an exemplary scenario 80 wherein the instruction version history indicates the individuals who were involved in the formulation of the instruction versions, and the individuals who were involved in the authoring of the instruction version motivations (e.g., the authors of various bug reports.) Participants might also be indicated for instruction version alteration descriptions (e.g., version notes accompanying a version), individuals who contributed screenshots or data captures that support an instruction version behavior observation, etc. An exemplary architecture might include relational references to various participants by the other sources of data comprising the instruction version history (e.g., as shown in FIG. 6, the bug report database 18 and/or version control database 22 may reference a participant data source 98.) Moreover, the displaying of information may include the displaying of contact items for some or all of the indicated participants, which may facilitate further contact with the participant if the researching developer has further questions or wishes to discuss an instruction version. For example, as illustrated in FIG. 6, the names of participants displayed within the development environment 12 may be hyperlinked, and the hyperlinks may lead to (e.g.) a biography page, a display of an office location and/or telephone number, and an email hyperlink that initiates an email message directed to the participant and entitled with reference to the instruction version (e.g., "Re: ContainerClasses version 0.8.3.4.") Such contact information may be stored, for example, in the participant data source 82, and may be retrieved by the development environment 12 and utilized in the displaying of version information history. Those of ordinary skill in the art may devise many ways of supplementing instruction version histories with participant information while implementing the techniques discussed herein.

As a second example of this fifth aspect, in addition to displaying an instruction version history for a selected instruction, the development environment may display software components utilized by the selected instruction, and/or software components that utilize the selected instruction. Such software components may comprise (e.g.) a class, a class instance, a member of a class (such as a member method, a member class instance or class declaration, a member primitive, a member constant declaration, etc.), a declared constant, a runtime, a script, an application programming interface, a code library, a linked or embedded resource. For example, if an entire method is selected, the development environment may display a list of the classes, interfaces, and methods invoked by the method, and a list of the other classes and class projects that invoke the method. FIG. 7 illustrates an exemplary scenario 90 wherein the selected instruction 32 within the instruction set 14 is a class declaration. Upon detecting a selection of this instruction, in addition to displaying the instruction versions 34 and the instruction version motivations 36, the development environment 12 may search the other portions of the current project and related projects to identify references to the selected class and components utilized by the class. Moreover, the entries of the displayed list of related components may be associated with the other software components, e.g., via hyperlinks to the locations of the related software components in the project or to documentation for such related software components. Those of ordinary skill in the art may devise many ways of identifying, displaying, and associating software components related to a selected instruction while implementing the techniques discussed herein.

A third example of this fifth aspect involves annotating instructions to supplement the instruction version history. In many scenarios, a developer may wish to annotate an instruction, e.g., to indicate the effects of the instruction or to explain an ambiguous operation. The annotations could be inserted as an inline comment, but this insertion might interrupt a reading of the instruction set, particularly if the annotation is lengthy. Instead, the annotation might be associated with an instruction but displayed separately as part of the metadata or documentation of the instruction. For example, an embodiment (such as the exemplary method 40 of FIG. 3) might be configured, upon receiving an instruction version annotation relating to an instruction version history, to store the instruction version annotation related to the instruction version history, and to display the instruction version annotation along with the instruction version history within the development environment when the instruction is selected.

FIG. 8 illustrates one such scenario 100 wherein a selected instruction 32 in the instruction set 14 is associated with an instruction version annotation 102 that explains the motivation for the configuration of the instruction. When the instruction is selected, the development environment 12 displays the instruction versions 34 and the instruction version motivations 36, and also displays the instruction version annotation 102 associated with the selected instruction 12. It may be appreciated that the instruction version annotation 102 could be included and displayed inline with the instruction in the instruction set 14, but this might unnecessarily encumber the length and readability of the source code. By displaying the instruction version annotation 102 along with the instruction version history, the development environment 12 presents to the user a fuller description of the instruction. As further illustrated in FIG. 8, the annotation may also be associated with a participant (as an extended variation of the exemplary scenario 80 of FIG. 6), and may be hyperlinked to facilitate contact with the participant in case further discussion about the instruction is desired. Those of ordinary skill in the art may devise many ways of receiving, storing, and displaying instruction version annotations alongside the instruction version history within the development environment while implementing the techniques discussed herein.

A sixth aspect that may vary among implementations of these techniques relates to options that may be extended to a developer to facilitate research into the history and description of an instruction version. In particular, a user may wish to indicate whether a particular item (such as a participant, an instruction, or a related software component) is of more interest, and that the user prefers to receive more information about the item, or is of less interest, and the user prefers to focus the research on other areas of the instruction history. Accordingly, the development environment may be configured to provide such options to the user, and may customize the displaying of information based on the user's indicated preferences.

As a first example of this sixth aspect, a user may wish to indicate a level of interest in an instruction. For example, the user may wish to indicate more interest in an instruction, and this indication may be construed as consent to be notified of subsequent instruction version histories relating to the instruction (e.g., subsequently posted bug reports, subsequent versions of the instruction registered with a version control system, and subsequent instruction version alteration descriptions, such as release notes referencing the instruction.) Accordingly, the development environment may be configured, upon detecting a user action within the development environment indicating more interest in a selected instruction, to add the selected instruction to a bookmarked instruction set. The user may then utilize the list of bookmarked instruction versions to check if the instructions of interest have recently changed. Alternatively or additionally, the development environment may treat the indication of interest as a subscription, such that the user wishes to be actively notified of subsequent changes. Accordingly, the development environment may be configured to monitor subsequent instruction version histories involving the bookmarked instruction, and to display the subsequent instruction version histories within the development environment. Conversely, if the user indicates less interest in a portion of an instruction version history for an instruction version, the information may be hidden within the development environment. For example, if a user indicates that a particular bug pertaining to an instruction is not related to the focus of the user's research, the development environment may hide any instruction versions and/or instruction version motivations involving the bug. Those of ordinary skill in the art may devise many ways of configuring the development environment to respond to indications of interest in instructions (such as instruction versions or instruction version histories) while implementing the techniques discussed herein.

FIG. 9 illustrates an exemplary scenario 110 wherein the development environment 12 offers an indicator set 112 relating to a selected instruction 32. The user may click on the buttons of the indicator set 112 to indicate, respectively, more interest or less interest in the selected instruction. If the user indicates more interest, the instruction may be added to a bookmarked instructions set, which may be displayed in the development environment 12 as a bookmarked instructions list 114, which the user may click on to jump to the location of the bookmarked instruction within the instruction set 14. Moreover, the development environment 12 may utilize the bookmarked instructions as subscriptions, and may display within the development environment 112 as a latest instruction version history list 116 (i.e., the latest activity in the project relating to the instruction), and such items may be clicked by the user to view more information about the instruction version history. Conversely, clicking the button to indicate less interest in the selected instruction 32 may remove the selected instruction 32 from the bookmarked instructions list, and/or may hide the instruction versions 34 and instruction version motivations 36 within the development environment 12 for the selected instruction 32.

As a second example of this sixth aspect, the development environment may permit a user to indicate a level of interest in a participant of an instruction version history relating to an instruction. If the user indicates more interest in a participant, the development environment may display more information within the development environment relating to the participant, e.g., additional instruction versions that the selected participant participated in creating, and/or additional instruction version motivations that the selected participant participated in creating. For example, if the user finds a particular tester's bug reports to be helpful, the user may indicate an interest in seeing other bug reports generated by the participant for the current project. Conversely, if the user indicates less interest in a participant, the development environment may hide some information relating to the participant, e.g., the name of the participant, additional instruction versions that the selected participant participated in creating, and/or additional instruction version motivations that the selected participant participated in creating. Those of ordinary skill in the art may devise many ways of configuring the development environment to display more or less information about participants based on a user's expressed interest level in the participant.

FIG. 10 presents an exemplary scenario 120 wherein the development environment 12 offers an indicator set 122 relating to a selected participant. The user may click on the buttons of the indicator set 122 to indicate, respectively, more interest or less interest in a participant. If the user indicates more interest, the development environment 12 may display more information, e.g., a list of participants of interest 124 and a list of additional activity 126 generated by the participants of interest with respect to the project. The user may click on the names of such participants of interest to view more information about them (e.g., a biography page or contact information), and may click on the other activity items to view other recent activities of the participant relating to the project. Conversely, clicking the button to indicate less interest in the selected participant may remove the participant from the list of participants of interest 124.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
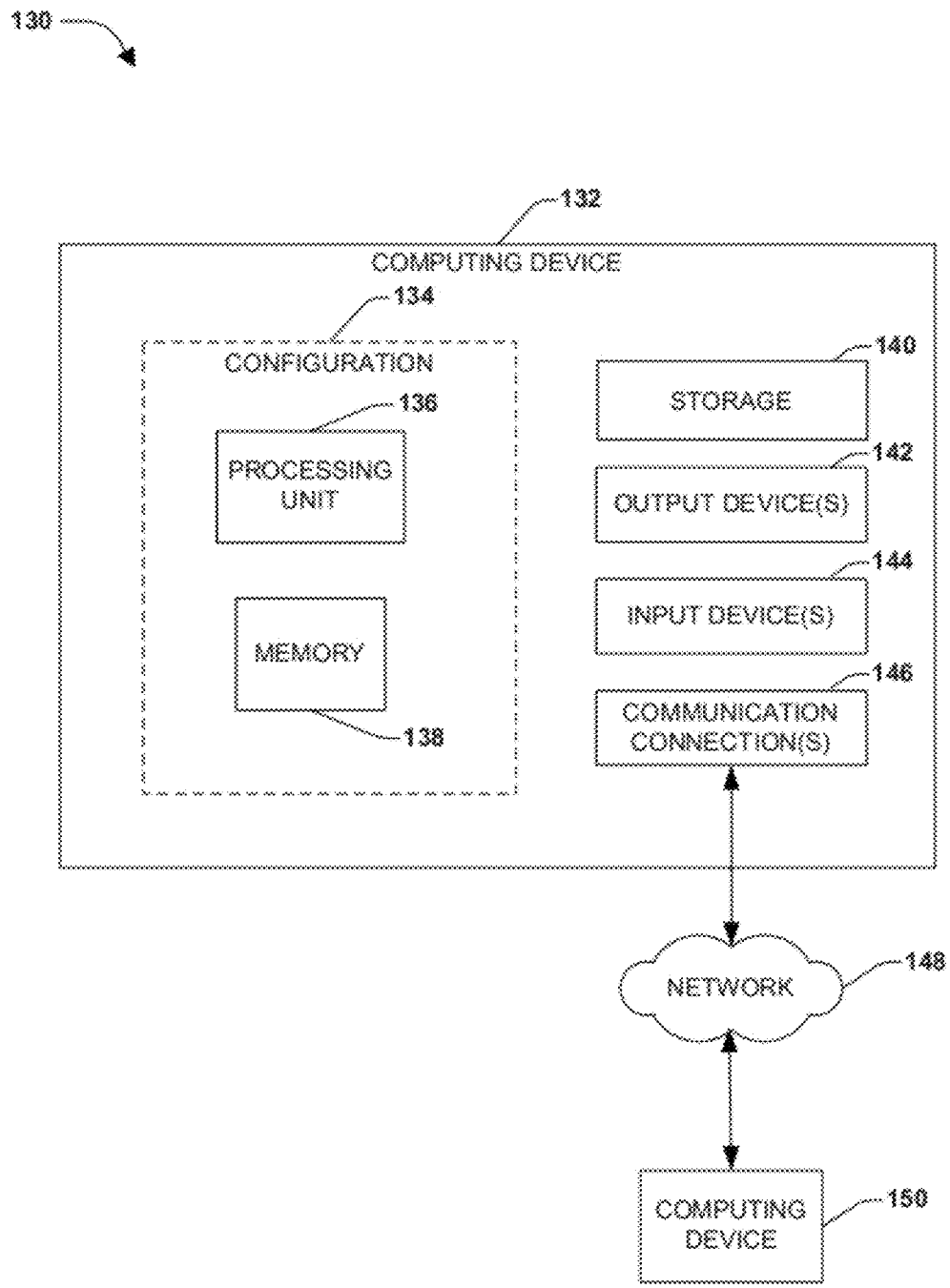
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 11 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 11 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of documenting an instruction set within a development environment of a computer having a processor, the method comprising:
   executing on the processor instructions configured to:
      present the instruction set in a window of the development environment;
      receive a selection of a selected instruction of the instruction set within the window;
      retrieve from an instruction version data source at least one instruction version history related to the selected instruction and comprising:
         an instruction version, and
         an instruction version motivation; and
      display the at least one instruction version history within the window of the development environment.

2. The method of claim 1:
   the instructions configured to detect a selected instruction in the development environment; and
   the displaying comprising: displaying the at least one instruction version history within the window of the development environment for the selected instruction.

3. The method of claim 2, the instructions configured to:
   upon detecting at least two instructions within an instruction set selection in the development environment:
      within the window, receive a selection of a first instruction in the instruction set selection, and
      display the at least one instruction version history within the window of the development environment for the first instruction; and
   upon detecting a user action selecting a second instruction in the window:
      select the second instruction in the instruction set selection, and
      display the at least one instruction version history within the window of the development environment for the second instruction.

4. The method of claim 1, the at least one instruction version history comprising at least one participant who participated in creating the at least one instruction version history.

5. The method of claim 4, the displaying comprising: displaying at least one contact item for at least one participant.

6. The method of claim 4, the instructions configured to: upon detecting a user action within the development environment indicating more interest in a selected participant, display in the window of the development environment at least one of:
at least one additional instruction version that the selected participant participated in creating; or
at least one additional instruction version motivation that the selected participant participated in creating.

7. The method of claim 4, the instructions configured to: upon detecting a user action within the development environment indicating less interest in a selected participant, hide within the window of the development environment at least one of:
the selected participant;
at least one additional instruction version that the selected participant participated in creating; or
at least one additional instruction version motivation that the selected participant participated in creating.

8. The method of claim 1, the instruction version motivation comprising:
an instruction version behavior observation, and
an instruction version alteration description in response to the instruction version behavior observation.

9. The method of claim 8, the instruction version behavior observation comprising at least one of:
an error observation;
an inefficiency observation;
an inconsistency observation;
an incompatibility observation;
an unexpected behavior observation;
an improvement opportunity observation; or
a deprecated technique observation.

10. The method of claim 8, the instruction version behavior observation comprising at least one of:
a narrative of an observed behavior of the instruction version;
a data capture relating to an observed behavior of the instruction version; or
a screenshot illustrating the observed behavior of the instruction version.

11. The method of claim 1, the instructions configured to: display within the window of the development environment at least one of:
an instruction version history of a software component utilized by the selected instruction, or
an instruction version history of a software component utilizing the selected instruction.

12. The method of claim 11, the software component comprising at least one of:
a class;
a class instance;
a member of a class;
a declared constant;
a runtime;
a script;
an associated software component;
an application programming interface;
a code library;
a linked resource; or
an embedded resource.

13. The method of claim 1, the instructions configured to: upon detecting a user action within the development environment indicating more interest in a selected instruction, add the selected instruction to a bookmarked instruction set.

14. The method of claim 13, the instructions configured to: for respective bookmarked instructions in the bookmarked instruction set:
monitor subsequent instruction version histories related to a bookmarked instruction, and
display the subsequent instruction version histories within the development environment.

15. The method of claim 1, the instructions configured to: upon detecting a user action within the development environment indicating less interest in an instruction version history, hide the instruction version history with respect to the selected instruction.

16. The method of claim 1:
the instructions configured to: upon receiving an instruction version annotation relating to an instruction version history, store the instruction version annotation related to the instruction version history; and
the displaying comprising: displaying within the window of the development environment instruction version annotations relating to the instruction version history.

17. A system for documenting an instruction set within a development environment of a computer having a memory and a processor, the system comprising:
an instruction version data source comprising at least one instruction version of respective instructions of the instruction set;
an instruction version motivation data source comprising at least one instruction version motivation relating to respective instruction versions of respective instructions of the instruction set; and
an instruction version history generating component configured to:
present the instruction set in a window of the development environment;
receive a selection of a selected instruction of the instruction set within the window;
retrieve at least one instruction version from the instruction version data source relating to the selected instruction;
retrieve at least one instruction version motivation from the instruction version motivation data source relating to respective instruction versions; and
an instruction version history displaying component configured to display within the window of the development environment at least one instruction version history comprising:
the at least one instruction version, and
the at least one instruction version motivation,
respective components of the system comprising instructions stored in the memory of the computer and executable on the processor of the computer.

18. The system of claim 17, the instruction version motivation data source comprising:
an instruction version behavior observation data source comprising at least one behavior observation relating to an instruction version; and
an instruction version alteration description comprising at least one description of an alteration of an instruction version in response to an instruction version observation.

19. The system of claim 17:
the system comprising:

a participant data source comprising at least one participant who participated in creating the at least one instruction version history; and the instruction version history generating component configured to:

retrieve at least one participant from the instruction version data source relating to the at least one instruction version history; and display within the window of the development environment the at least one participant.

20. A computer-readable storage device comprising instructions that, when executed on a processor of a computer, document an instruction set within a development environment by:

presenting the instruction set in a window of the development environment;

receiving a selection of a selected instruction of the instruction set within the window;

retrieving from an instruction version data source at least one instruction version history related to the selected instruction and comprising:

an instruction version;

at least one participant who participated in creating the at least one instruction version history; and an instruction version motivation comprising:

an instruction version behavior observation, and an instruction version alteration description in response to the instruction version behavior observation;

displaying the at least one instruction version history within the window of the development environment;

displaying within the window of the development environment instruction version annotations relating to the at least one instruction version history;

displaying within the window of the development environment at least one of:

an instruction version history of a software component utilized by the selected instruction, or an instruction version history of a software component utilizing the selected instruction;

upon detecting a user action within the development environment indicating more interest in a selected participant, displaying within the window of the development environment at least one of:

at least one additional instruction version that the selected participant participated in creating, or at least one additional instruction version motivation that the selected participant participated in creating;

upon detecting a user action within the development environment indicating less interest in a selected participant, hiding within the window of the development environment at least one of:

the selected participant, at least one additional instruction version that the selected participant participated in creating, or at least one additional instruction version motivation that the selected participant participated in creating;

upon detecting a user action within the development environment indicating more interest in a selected instruction, adding the selected instruction to a bookmarked instruction set;

for respective bookmarked instructions in the bookmarked instruction set:

monitoring subsequent instruction version histories involving the bookmarked instruction, and displaying the subsequent instruction version histories within the window of the development environment;

upon detecting a user action within the development environment indicating less interest in an instruction version history, hiding within the window of the development environment the instruction version history with respect to a selected instruction; and upon receiving an instruction version annotation relating to an instruction version history, storing the instruction version annotation related to the instruction version history.

\* \* \* \* \*